No. 877,352. PATENTED JAN. 21, 1908.
H. LUND.
CYLINDER WRENCH.
APPLICATION FILED MAY 31, 1905.
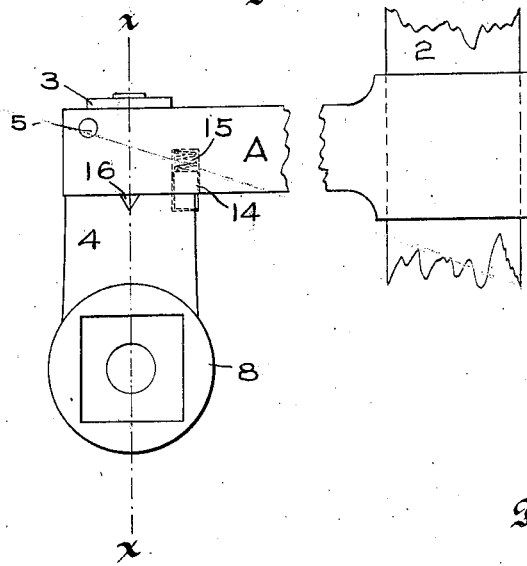
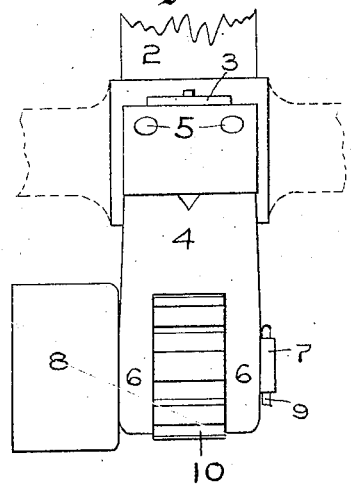
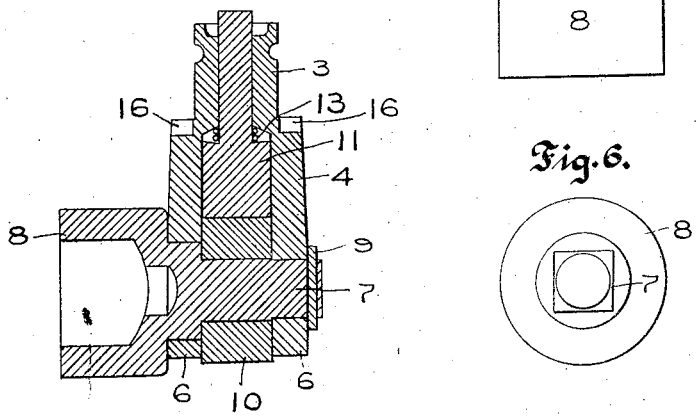
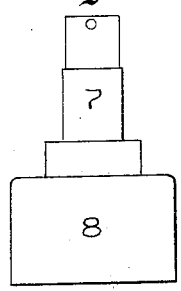
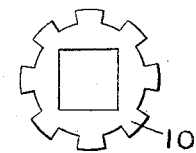
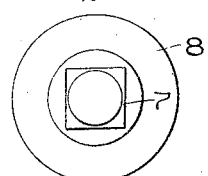
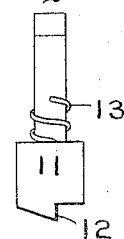
Witnesses,
W. H. Palmer
Emily F. Otis
Inventor,
Henry Lund.
By
his Attorneys.

UNITED STATES PATENT OFFICE.

HENRY LUND, OF GRAFTON, NORTH DAKOTA, ASSIGNOR, BY DIRECT AND MESNE ASSIGNMENTS, TO FOSSTON MANUFACTURING COMPANY, OF ST. PAUL, MINNESOTA, A CORPORATION OF MINNESOTA.

CYLINDER-WRENCH.

No. 877,352.　　Specification of Letters Patent.　　Patented Jan. 21, 1908.

Application filed May 31, 1905. Serial No. 263,018.

*To all whom it may concern:*

Be it known that I, HENRY LUND, a citizen of the United States, residing at Grafton, in the county of Walsh and State of North Dakota, have invented certain new and useful Improvements in Cylinder-Wrenches, of which the following is a specification.

My invention relates to improvements in wrenches, designed especially for use in connection with threshing cylinders; to tighten and loosen the bolts which secure the cylinder teeth in place, and consists particularly in improvements in the wrench covered by U. S. Letters Patent No. 644,676 issued to me on March 6, 1900.

To this end my invention consists in the features of construction and combination hereinafter described and claimed.

In the accompanying drawings forming part of this specification, Figure 1 is a plan view of my improved wrench partly broken away; Fig. 2 is a side elevation of the same; Fig. 3 is a section on line x—x of Fig. 1; Fig. 4 is a detail of the wrench-socket; Fig. 5 is a detail of a ratchet-wheel arranged in connection therewith; Fig. 6 is an end view of the wrench-socket; and Fig. 7 is a detail of a locking dog.

In the drawings A represents a bar or rod provided at one end with a transversely extending handle 2, and at its other end with an opening through which extends the stem 3 of the wrench-head 4. The wrench-head is rotatable in the end of the bar and is secured against endwise displacement by a pin 5. The wrench-head projects at approximately a right-angle to the bar A and at its outer end is bifurcated to form the ears 6.

The trunnion or stem 7 of the wrench-socket 8 is passed through and mounted to rotate in the ears 6 of the wrench-head, and is secured against endwise displacement by a pin 9. Mounted upon the squared portion of the stem 7 is a ratchet-wheel 10, the teeth of which are adapted to work in both directions. Slidably extending through the stem 3 of the wrench-head is a dog 11, the inner end of the dog being provided with a tooth 12 to engage with the ratchet-wheel teeth and the outer end extending beyond the end of the stem 3, as shown. The dog is held in engagement with the teeth of the ratchet-wheel by a suitable coil spring 13. The dog 11 is rotatable so that the engaging side of the tooth 12 may be positioned to bear against either side of the ratchet-wheel teeth to determine the direction of rotation of the wrench-socket. The projecting end of the dog 11 forms a finger-hold to permit turning of the dog.

To set the wrench-head in adjusted positions I provide a detent 14 arranged in a socket in the end of the bar A and held forced outwardly by a spring 15 into one of the interspaced notches 16 in the adjacent edge of the wrench-head.

In operation, the dog 11 will be turned to engage with the teeth of the ratchet-wheel from the desired side. By then oscillating the bar A, handle 2, and wrench-head the nut may be unscrewed by ratchet action. When it is desired to unscrew a nut in the opposite direction the dog should be turned to engage with opposite sides of the ratchet-wheel teeth. By providing an actuating dog of the character shown the dog is forced outwardly by the teeth of the ratchet-wheel so that when in extreme outward position it can be easily turned. The construction of wrench-socket, actuating handle, etc. may be considerably modified without departing from my invention, the scope of which is defined in the claims.

Having now described my invention, what I claim as new, and desire to secure by Letters Patent, is:—

1. In a wrench, the combination with a wrench-head, of a nut-socket rotatably mounted in said wrench-head and provided with a ratchet, a spring pressed reversible dog engaging with said ratchet, said dog being rotatable within said wrench-head and provided with a spindle extending longitudinally through said head.

2. In a wrench, the combination with a bar, of a wrench-head pivoted thereto, a nut-socket rotatably mounted in said wrench-head and provided with a ratchet, a reversible spring pressed dog rotatable within said wrench-head and engaging with said ratchet, and a spring pressed detent supported in said bar in position to engage with interspaced notches in the adjacent edge of said wrench-head.

In testimony whereof I affix my signature in presence of two witnesses.

HENRY LUND.

Witnesses:
H. S. JOHNSON,
EMILY F. OTIS.